(12) United States Patent
Hirai (10) Patent No.: US 8,714,829 B2
(45) Date of Patent: May 6, 2014

(54) WHEEL BEARING ASSEMBLY

(75) Inventor: Isao Hirai, Iwata (JP)

(73) Assignee: NTN Corporation, Osaka (JP)

( * ) Notice: Subject to any disclaimer, the term of this patent is extended or adjusted under 35 U.S.C. 154(b) by 334 days.

(21) Appl. No.: 12/737,798

(22) PCT Filed: Aug. 18, 2009

(86) PCT No.: PCT/JP2009/003919
§ 371 (c)(1),
(2), (4) Date: Feb. 17, 2011

(87) PCT Pub. No.: WO2010/021118
PCT Pub. Date: Feb. 25, 2010

(65) Prior Publication Data
US 2011/0135240 A1    Jun. 9, 2011

(30) Foreign Application Priority Data

Aug. 22, 2008   (JP) ................................. 2008-213626

(51) Int. Cl.
F16C 13/00 (2006.01)
F16C 33/30 (2006.01)

(52) U.S. Cl.
USPC ......... 384/544; 384/589; 384/625; 29/898.13

(58) Field of Classification Search
USPC .................. 384/589, 544, 625; 29/898.13
See application file for complete search history.

(56) References Cited

U.S. PATENT DOCUMENTS

| | | | |
|---|---|---|---|
| 6,450,585 B1 | 9/2002 | Kochsick | |
| 7,004,637 B1 * | 2/2006 | Uyama et al. | ................. 384/544 |
| 7,267,490 B2 | 9/2007 | Ozawa et al. | |
| 7,452,136 B2 * | 11/2008 | Hirai et al. | ..................... 384/544 |
| 7,695,195 B2 * | 4/2010 | Okasaka | ........................ 384/544 |
| 7,909,517 B2 * | 3/2011 | Ohtsuki et al. | ................. 384/544 |
| 8,192,088 B2 * | 6/2012 | Ohtsuki et al. | ................. 384/544 |
| 8,215,846 B2 * | 7/2012 | Hirai | ............................. 384/544 |
| 8,240,922 B2 | 8/2012 | Hirai et al. | |
| 8,302,309 B2 * | 11/2012 | Hirai et al. | ............... 29/894.321 |
| 2003/0151223 A1 | 8/2003 | Ozawa et al. | |
| 2004/0169415 A1 | 9/2004 | Kapaan et al. | |

(Continued)

FOREIGN PATENT DOCUMENTS

| | | |
|---|---|---|
| CN | 1281405 | 1/2001 |
| CN | 1426908 | 7/2003 |

(Continued)

OTHER PUBLICATIONS

K. Palaniradja, Modeling of phase transformation in induction hardening, Oct. 8, 2009, The Open Materials Science Journal, 2010, 4, 64-73.*

(Continued)

*Primary Examiner* — Marcus Charles (57) ABSTRACT

A wheel support bearing assembly includes an outer member and an inner member, each having a raceway surface. The inner member is made up of a combination of a rotatable ring, having its outer periphery formed with a vehicle body fitting flange, and a separate member. Each of the outer member and the flanged rotatable ring has a surface region representing a thermally refined structure formed by means of martensite hardening and high temperature tempering and also has a core region representing an as-forged structure made up of ferrite and pearlite.

10 Claims, 10 Drawing Sheets

OUTBOARD SIDE ← → INBOARD SIDE

(56) References Cited

U.S. PATENT DOCUMENTS

| | | |
|---|---|---|
| 2004/0252927 A1 | 12/2004 | Hirai et al. |
| 2005/0141798 A1* | 6/2005 | Okasaka ......................... 384/544 |
| 2005/0141799 A1 | 6/2005 | Uyama et al. |
| 2008/0205810 A1* | 8/2008 | Maeda et al. ................. 384/544 |
| 2009/0137326 A1* | 5/2009 | Hirai et al. .................... 464/145 |
| 2009/0189436 A1* | 7/2009 | Hirai et al. .................... 301/110 |
| 2010/0316319 A1* | 12/2010 | Hirai ............................. 384/490 |

FOREIGN PATENT DOCUMENTS

| | | |
|---|---|---|
| CN | 1678469 | 10/2005 |
| CN | 101223291 | 7/2008 |
| JP | 2005-3061 | 1/2005 |
| JP | 2007-51748 | 3/2007 |
| JP | 2007-51750 | 3/2007 |
| JP | 2007-211987 | 8/2007 |
| JP | 2008-169941 | 7/2008 |

OTHER PUBLICATIONS

International Search Report for PCT/JP2009/003919 mailed Nov. 24, 2009.

English Translation of the International Preliminary Report on Patentability issued Mar. 17, 2011 in corresponding International Patent Application PCT/JP2009/003919.

Chinese Office Action issued Sep. 29, 2012 in corresponding Chinese Patent Application No. 200980131986.3.

\* cited by examiner

Fig. 1

OUTBOARD SIDE ← → INBOARD SIDE

OUTBOARD SIDE ← → INBOARD SIDE

Fig. 7

← OUTBOARD SIDE

INBOARD SIDE →

Fig. 8

← OUTBOARD SIDE    INBOARD SIDE →

Fig. 9

OUTBOARD SIDE → INBOARD SIDE

Fig. 10

← OUTBOARD SIDE　　　INBOARD SIDE →

Fig. 11

← OUTBOARD SIDE        INBOARD SIDE →

Fig. 12

← OUTBOARD SIDE     INBOARD SIDE →

WHEEL BEARING ASSEMBLY

CROSS REFERENCE TO RELATED APPLICATIONS

This application claims the benefit under 35 U.S.C. Section 371, of PCT International Application No. PCT/JP2009/003919, filed Aug. 18, 2009, which claimed priority to Japanese Application No. 2008-213626, filed Aug. 22, 2008, in the Japanese Patent Office, the disclosures of which are hereby incorporated by reference.

BACKGROUND OF THE INVENTION

1. Field of the Invention

The present invention relates to a wheel bearing assembly for use in automotive vehicles and freight cars, which has an improved strength.

2. Description of the Related Art

In some of the wheel support bearing assemblies of the second and third generation types, in which an inner member is used on a rotatable side and an outer member is used on a stationary side, a vehicle fitting flange, through which the wheel support bearing assembly is secured to an automotive vehicle, has hitherto been provided on an outer periphery of the outer member. Because of the provision of the vehicle fitting flange, the required strength has been secured by the use of a medium carbon steel (C=0.5 to 0.8 wt %) such as, for example, S53C as material for the outer member in terms of the processability during the hot forging. Although the rolling surface in the outer member is partially hardened by means of the induction heating treatment in order for it to have a required hardness as a rolling area of the bearing assembly, other portions than the rolling area are left untreated thermally and they are used as forged or non-hardened.

Also, even the inner member (hub, hub ring) of the wheel support bearing assembly, which serves as a rotatable member, and the outer member in some of the wheel support bearing assemblies of the second generation type, in which the outer member is used as a rotatable member, are made of a medium carbon steel in a manner similar to that described above, and the rolling surface is partially hardened by means of the induction heating treatment whereas the other portions than the rolling area are left untreated thermally and they are used as forged.

Demands for reduction in weight of the wheel support bearing assembly in the course of reduction in weight of the automotive vehicle are now increasing, and even the wheel support bearing assembly, which has been reduced in weight and size, is required to have a functionality similar to that afforded by the conventional bearing assembly. For example, to meet with the demands for reduction in weight (in volume), it is quite often that the vehicle fitting flange integral or rigid with the outer member serving as the stationary member is downsized and/or thin walled.

It has, however, been found that if the vehicle fitting flange integral or rigid with the outer member is downsized and/or thin walled, stresses generated in various parts of the wheel support bearing assembly during the cornering of the automotive vehicle tend to become high and, therefore, the strength properties against repeated loading is required. To satisfy the strength properties, it has been well known in the art to thermally refining the outer member by means of quenching and tempering to thereby increase the tensile strength and the fatigue strength. Also, even in the case of the rotatable member (hub ring, or the outer member of an outer ring rotating model of the wheel support bearing assembly of the second generation type), the rotatable member in its entirety is thermally refined to increase the fatigue strength of a prominently stressed site during the cornering of the automotive vehicle. (See, for example, the Patent Documents 1 and 2 listed below.)

[Patent Document 1] JP Laid-open Patent Publication No. 2005-003061

[Patent Document 2] JP Laid-open Patent Publication No. 2007-211987

The thermal refinement by way of quenching and tempering is considered the best technique to increase the mechanical characteristics such as, for example, toughness and fatigue strength if the member is transformed completely into the martensite structure during the quenching and then into the sorbite (micro-pearlite) structure by means of tempering.

However, in the face of limitations in shape and size of the member to be thermally refined, it has been found that an attempt to quench it in water, which results in a quick cooling, to transform completely into the martensite structure tends to result in quench cracking and/or quench deformation.

Also, when the member is transformed completely into the martensite structure in not only a surface region thereof, but deep into the core region thereof, the residual stress in circumferential and axial directions of the member surface gives rise to the tensile stress, which in turn becomes a high tensile stress when combined with a stress generated by the loading of a load. As a result, the member becomes susceptible to cracking, which is apt to propagate.

SUMMARY OF THE INVENTION

An object of the present invention is to provide a wheel support bearing assembly, in which the fatigue strength of component parts can be increased.

The wheel support bearing assembly according to one aspect of the present invention is for rotatably supporting a vehicle wheel relative to a vehicle body structure, which includes an outer member having an inner periphery formed with double row rolling surfaces and also having an outer periphery formed with a vehicle fitting flange through which the wheel support bearing assembly is fitted to the vehicle body structure; an inner member having an outer periphery formed with raceway surfaces held in face-to-face relation with the respective raceway surfaces in the outer member; and double row rolling elements interposed between those raceway surfaces. The outer member is made of a steel material and has a surface region having a thermally refined structure, formed by means of martensite hardening and high temperature tempering, and also has a core region having an as-forged or non-hardened structure made of ferrite and pearlite.

According to this construction, while the outer member is used as a stationary ring having a vehicle body fitting flange formed therein, the outer member has a surface region, which has a thermally refined structure formed by means of martensite hardening and high temperature tempering, and also has a core region, which has an as-forged structure made of ferrite and pearlite. For this reason, the surface of the flanged outer member is subjected to residual compressive stresses in axial and circumferential directions and, therefore, the fatigue strength against high frequency load can be increased.

The wheel support bearing assembly according to another aspect of the present invention includes an outer member having an inner periphery formed with double row rolling surfaces and also having an outer periphery formed with a vehicle fitting flange through which the wheel support bearing assembly is fitted to the vehicle body structure; an inner member having an outer periphery formed with raceway surfaces held in face-to-face relation with the respective raceway surfaces in the outer member; and double row rolling elements interposed between those raceway surfaces. One of the outer and inner members, which is used as a rotatable member, includes a sole flanged rotatable ring member having an outer periphery thereof formed with a raceway surface and also with a wheel mounting flange for the support of a vehicle wheel, or a combination of a flanged rotatable ring, having a wheel mounting flange defined therein, and a separate member mounted on the flanged rotatable ring and having the raceway surface. The flanged rotatable ring is made of a steel material and has a surface region representing a thermally refined structure formed by means of martensite hardening and high temperature tempering and also has a core region representing an as-forged structure comprised of ferrite and pearlite. The sole flanged rotatable ring is, for example, an outer member, where it is used in outer ring rotation type. The flanged rotatable ring that is combined with the separate member is, for example, a hub or a hub ring. The hub referred herein above and hereinafter means the flanged rotatable ring to be combined with the separate member in the inner member and having no raceway surface formed in the outer periphery thereof, whereas the hub ring referred to above and hereinafter means the flanged rotatable ring to be combined with the separate member in the inner member and having a raceway surface in the outer periphery thereof.

According to this construction, the surface region of the flanged rotatable ring represents the thermally refined structure which is formed by means of martensite hardening and high temperature tempering while the core region thereof represents the as-forged structure made of ferrite and pearlite by means of cored hardening. For this reason, the surface region of the flanged rotatable ring is subjected to the residual compressive stress in the axial and circumferential directions and the fatigue strength against high frequency load can be increased.

In the wheel support bearing assembly, for example, the inner member includes a sole flanged rotatable ring member having an outer periphery thereof formed with a raceway surface and also with a wheel mounting flange for the support of a vehicle wheel, or a combination of the flanged rotatable ring, having a wheel mounting flange defined therein, and a separate member mounted on the flanged rotatable ring and having the raceway surface. The flanged rotatable ring is made of a steel material and has a surface region representing a thermally refined structure formed by means of martensite hardening and high temperature tempering and also has a core region representing an as-forged structure comprised of ferrite and pearlite.

According to this construction, the flanged rotatable ring has its surface region representing the thermally refined structure formed by means of martensite hardening and high temperature tempering while the core region thereof represents the as-forged structure made of ferrite and pearlite by means of cored hardening. For this reason, the surface region of the flanged rotatable ring is subjected to the residual compressive stress in the axial and circumferential directions and the fatigue strength against high frequency load can be increased.

In the present invention, an outer diametric portion of the outer member or an outer diametric portion of the flanged rotatable ring, or the wheel mounting flange may have a forged skin portion of which surface representing a thermally refined structure. The thickness of the forged skin portion, which represents the thermally refined structure, is preferably within the range of ⅛ to ⅓ of the wall thickness of the final forged product.

In the present invention, a surface region of a root portion of the vehicle body fitting flange or wheel mounting flange may represent a turned surface of an arcuate sectioned configuration and also representing a thermally refined structure.

In the present invention, the inner member may include a combination of the flanged rotatable ring and the separate member, in which case the separate member is fixed to the flanged rotatable ring by means of crimping of the flanged rotatable ring.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A first preferred embodiment of the present invention will now be described in detail with particular reference to FIGS. 1 to 5. The wheel support bearing assembly shown therein, being for use in an automotive vehicle, is shown in the form of a double row tapered roller bearing classified as the second generation type and is of an inner ring rotating type and of an axle suspension system employed for rotatably supporting a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
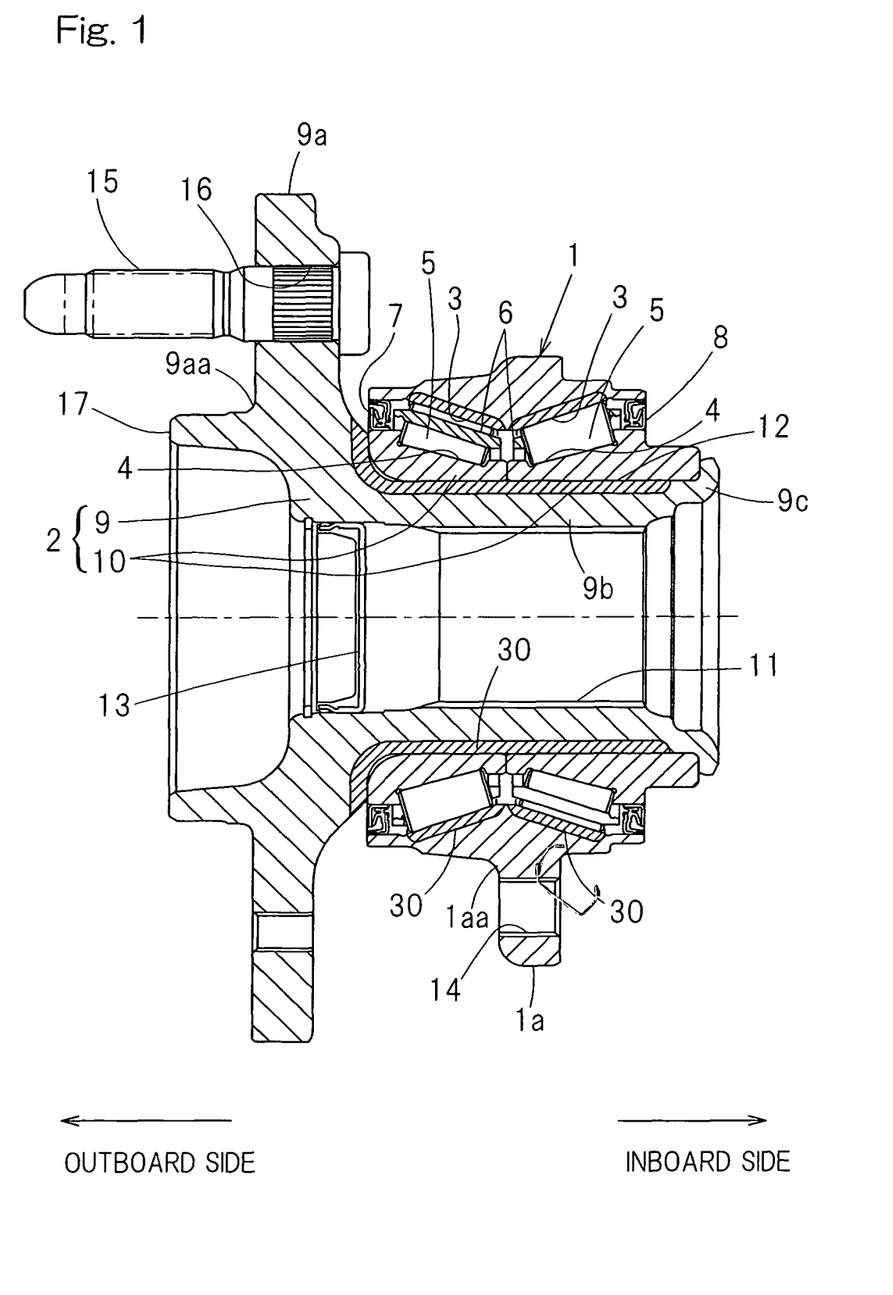
FIG. 1 is a sectional view showing a wheel support bearing assembly according to a first preferred embodiment of the present invention.

The wheel support bearing assembly of the type referred to above includes, as best shown in FIG. 1, an outer member 1 having an inner periphery formed with a plurality of, for example, double rows of rolling surface area 3, an inner member 2 having an outer periphery formed with rolling surface areas 4 in alignment with the respective rolling surface areas 3 in the outer member 1, and double rows of rolling elements 5 interposed between the rolling surface areas 3 and 4 in the outer and inner members 1 and 2. The rolling elements 5 of each row are employed in the form of tapered rollers, which are retained in a corresponding roller retainer 6 employed for each row. Opposite open ends of an annular bearing space delimited between the outer and inner members 1 and 2 are sealed by respective sealing units 7 and 8, which form associated sealing devices.

The outer member 1 serves as a stationary member and is of one piece construction including a vehicle fitting flange 1a which is formed integrally with an outer periphery thereof and through which the wheel support bearing assembly is rigidly coupled with a axle tube (not shown) forming a part of an automobile suspension system mounted on a vehicle body structure. The vehicle body fitting flange 1a has a bolt hole 14 defined therein at a plurality of circumferential locations thereof, and the vehicle body fitting flange 1a is rigidly coupled with the axle tube when vehicle fitting bolts, passed through corresponding bolt insertion holes in the axle tube from the inboard side, are firmly threaded into the bolt holes 14.

The inner member 2 serves as a rotatable member and includes a hub 9, having a wheel mounting flange 9a and also having no rolling surface area defined therein, and two inner rings 10, which are separate members and mounted under interference fit on an outer periphery of an axle portion 9b of the hub 9 while having been arranged coaxially with each other in a direction axially of the axle portion 9b. The rolling surface areas 4 for the respective rows of the rolling elements 5, which are referred to above, are defined on respective outer peripheries of those inner rings 10. An end portion of the outer periphery of the hub 9 on the inboard side is radially inwardly stepped to define an inner ring mounting surface area 12 of a reduced diameter and the inner rings 10 forming the inner member 2 are mounted on such inner ring mounting surface area 12 in axially aligned relation to each other. Those inner rings 10 are axially fixed relative to the hub 9 by means of a crimped portion 9c, which is an inboard end of the axle portion 9b of the hub 9 that is radially outwardly crimped to fix those inner rings 10 in position. The hub 9 has a center bore 11 defined therein in coaxial relation with the longitudinal axis of the axle portion 9b thereof for receiving therein a vehicle axle (not shown) for rotation together therewith, and a cap 13 is fitted onto an outboard end of the center bore 11 for avoiding ingress of foreign matter from the outside. The wheel mounting flange 9a is formed with a press-fit hole 16 at a plurality of circumferential locations thereof for receiving therein a corresponding hub bolt 15 under interference fit. A portion of the hub 9 adjacent a root portion of the wheel mounting flange 9a has a cylindrical pilot area 17 defined therein so as to protrude axially outwardly towards the outboard side for guiding a brake rotor and the vehicle wheel, both not shown. This pilot area 17 facilitates mounting of the brake rotor and the vehicle wheel in overlapped relation onto the wheel mounting flange 9a, with respective wheel nuts (not shown) firmly threaded to the hub bolts 15 to thereby fix the vehicle wheel to the wheel mounting flange 9a. Each of the hub bolts 15 is employed in the form of a stud bolt.

Any of the outer member 1 and the component parts of the inner member 2, which include the hub 9 and the inner rings 10, is prepared from a hot forged product of steel material. Specifically, for the steel material, a medium steel (C=0.5 to 0.8 wt %) such as, for example, S53C is chosen as that for the outer member 1 and the hub 9 in view of processability during the hot forging. Also, a high carbon chromium bearing steel is chosen as that for the inner rings 10. The hub 9 is formed by turning a surface region of the hot forged product as shown by double dotted chain lines in FIG. 2. Similarly, the outer member 1 is also formed by turning a surface region of the hot forged product as shown by the double dotted chain line as shown in FIG. 3.

Manufacture of each of the outer member 1 and the hub 9 is carried out in the sequence of hot forging→surface thermal refinement→turning→induction heating treatment of the rolling surface areas→grinding→assemblage.

Figure 2:
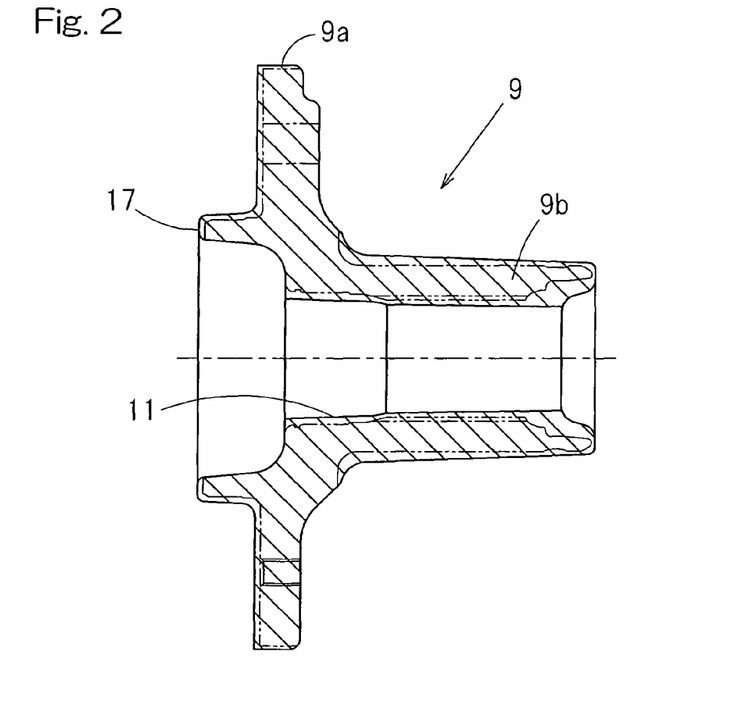
FIG. 2 is a sectional view showing a final forged product for a hub employed in the wheel support bearing assembly.
Figure 3:
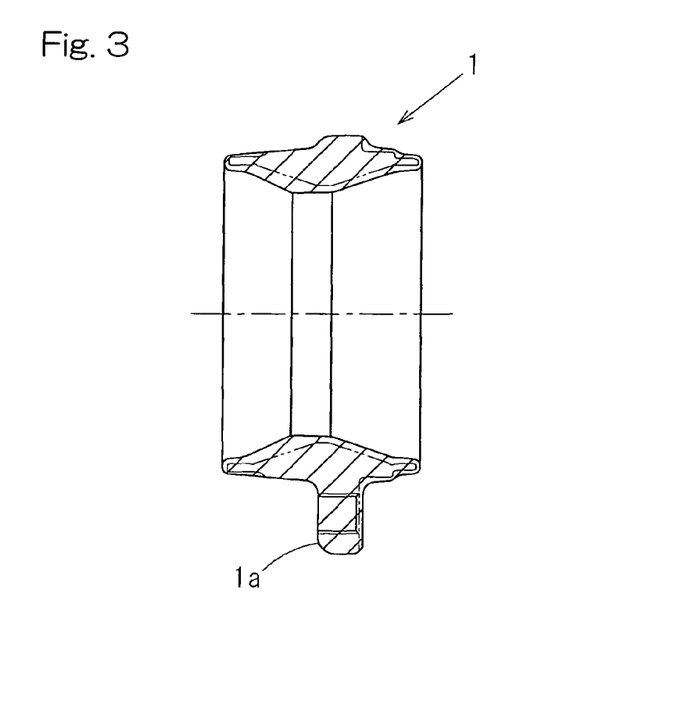
FIG. 3 is a sectional view, showing a final forged product for an outer member employed in the wheel support bearing assembly.

In other words, the material for each of the outer member 1 and the hub 9 is rendered to be a final forged product formed by hot forging, and after a surface region of this final forged product has been thermally refined, the turning is performed as shown by the double dotted chain lines in FIGS. 2 and 3.

It is, however, to be noted that where fluctuation of the flange, which is either or both of the wheel mounting flange 9a integral with the hub 9 and the vehicle body fitting flange 1a integral with the outer member 1, is severely restricted by the reason that it tends to increase the brake judder during the braking of the automotive vehicle, it is recommended to perform a secondary turning treatment subject to a flange surface either subsequent to the induction heating treatment or after assemblage has been made as shown in FIG. 1, as will be described in detail later.

After the turning treatment, a raceway surface portion on an inner diameter of the outer member 1 is provided with a hardened region 30 having a hardness of 58 to 64 HRC and formed by an induction heating treatment, so that that raceway surface portion can have a hardness required in the bearing assembly. Also, a mounted portion of the hub 9, where the inner rings 10 are mounted, is provided with a hardened portion 30 having a hardness of 58 to 64 HRC and formed by the induction heating treatment, so that fretting wear with the inner rings 10 can be avoided and, also, the rigidity of the hub 9 can be increased. Thereafter, the induction heat treated, hardened portions 30 in the outer member 1 and in the hub 9 are ground and, after the surface has been finished, assemblage takes place.

The thermal refinement referred to previously is a process of martensite hardening of a surface region of the final forged product and tempering it at an elevated temperature to form a thermally refined structure (sorbite or troostite structure). A core region of each of the outer member 1 and the hub 9 is rendered to represent an as-forged structure comprised of ferrite and pearlite in the case of subeutectoid steel, or pearlite in the case of eutectoid steel, or pearlite and cementite in the case of hypereutectoid steel. In other words, the thermal refinement in this case is a cored hardening, in which no core region is hardened. In order to perform such a cored hardening, particularly where any of the outer member 1 and the hub 9 is relatively large size such as that used in the wheel support bearing assembly in a pick-up truck, the final forged product used for the outer member 1 or the hub 9 is preferably hardened by means of an oil quenching after it has been heated within a continuous furnace. With the thermal refinement so performed in the manner described above, because the cooling velocity is retarded due to the oil quenching and the core region of any of the outer member 1 and the hub 9 both having a substantial wall thickness is cooled slowly, no martensite transformation occurs and only the surface region can be hardened with no cracking being accompanied. After the quenching, a high temperature tempering is performed and, in order to avoid the tempering brittleness after retention, it is rapidly quenched in water.

Figure 5:
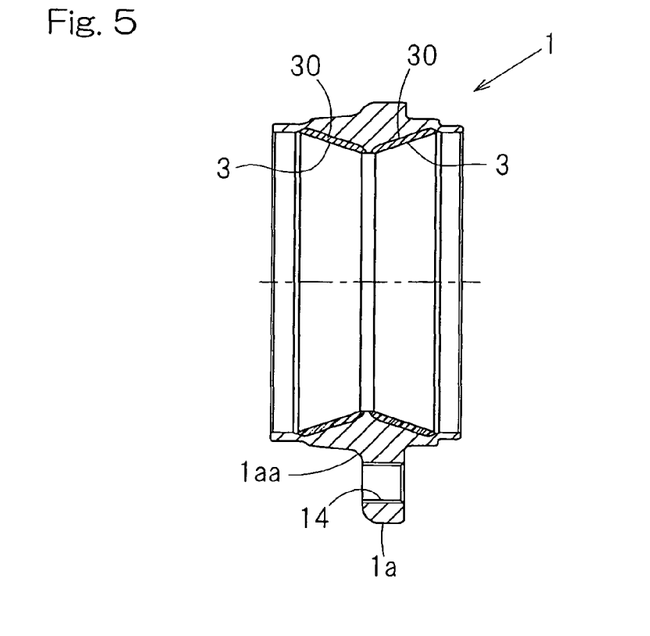
FIG. 5 is a sectional view showing the outer member employed in the wheel support bearing assembly.

It is to be noted that although an outer diametric portion of the outer member 1 has a forged skin portion that is left without being turned, a surface region of this forged skin portion represents the thermally refined structure referred to above. Also, even in a portion where turning is applied, the thickness and the turning allowance of that portion representing the thermally refined structure are so chosen that the above portion representing the thermally refined structure remains even after the turning treatment. By way of example, as shown in FIG. 5, where a surface region of the root portion of the vehicle fitting flange 1a integral with the outer member 1 is desired to be turned to define an arcuately sectioned turned surface 1aa, care must be taken that the thermally refined structure remains in at least this turned surface 1aa. In such case, the thickness of the thermally refined structure of the surface of the finally forged product is preferably so chosen to fall within the range of ⅛ to ⅓ of the wall thickness (of the finally forged product) before the turning treatment by the reason which will now be described below.

S53C, which is used as material for the outer member 1, is a carbon steel and is indigenously insensitive to being hardened. Because of it, if the steel has a substantial thickness, such steel in its entirety cannot be transformed to a thermally refined structure.

If quenching is carried out deep into a center portion of the outer member 1, quench cracking tends to occur.

If only the surface region of the outer member 1 is subjected to the cored hardening to render it to form the thermally refined structure, the surface residue stress becomes a compressive stress and, therefore, it can be rendered highly resistant to fatigue.

The greater the thickness of the thermally refined structure, it approaches the through hardening in which an entire region including a core region is hardened, and the residue compressive stress in the surface decreases.

The turned portion must have the thermally refined structure of a thickness sufficient to allow the thermally refined structure to remain in the surface even after the turning treatment.

Figure 4:
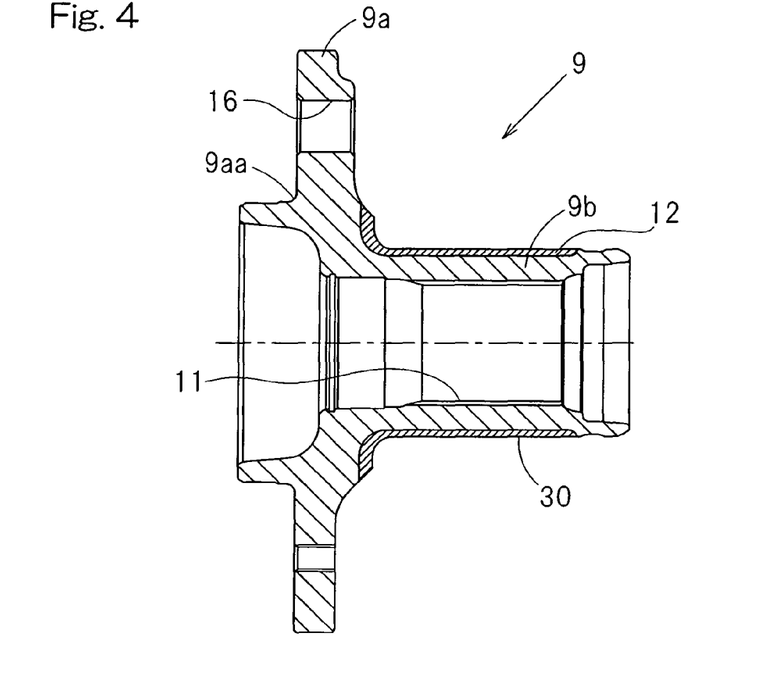
FIG. 4 is a sectional view showing the hub employed in the wheel support bearing assembly.

Also, as shown in FIG. 4, although it may occur that the forged skin portion, which is left unturned, may be left in the wheel mounting flange 9a integral with the hub 9, which is a flanged rotatable ring member, the surface region of this forged skin portion is the portion representing the thermally refined structure. Where the forged skin portion exists in the outer diametric portion of the hub 9, the surface region of that forged skin portion is the portion representing the thermally refined structure. In addition, the surface region of the root portion of the wheel mounting flange 9a in the hub 9 is rendered to be an arcuately sectioned turned surface 9aa, and the thermally refined structure remains in at least this turned surface 9aa. Even in such case, as is the case with the outer member 1, the thickness of the portion representing the thermally refined structure in the surface region of the final forged product is preferably within the range of ⅛ to ⅓ of the wall thickness of the final forged product.

For the steel material, which is a material for the outer member 1 and the hub 9 that are to be thermally refined, the use is preferred of a steel of a kind having the ideal critical diameter DI (austenite grain size number 8 in the underwater quiescence) (Cooling power: H=1.0)) which is equal to or smaller than 45 mm (1.77 inch).

According to the wheel support bearing assembly of the construction hereinabove described, the following functional effects can be obtained. Since each of the outer member 1 and the hub 9, which is a flanged rotatable ring member, is made of the specific steel material and the surface region of each of such outer member 1 and hub 9 represents the thermally refined structure, which has been subjected to the martensite quenching and high temperature tempering, and has its core region subjected to the cored hardening to leave the core region to represent the as-forged structure consisting of ferrite and pearlite, the surface of each of the flanged outer member 1 and the flanged hub 9 is subjected to residual compressive stresses in axial and circumferential directions and, therefore, the fatigue strength against high frequency load can be increased.

As an alternative method to form the hardened and then tempered structure in the surface region of each of the outer member 1 and the hub 9, a process of heating the surface in its entirety by means of the induction hardening and then tempering it within a heating furnace or by means of the induction heating treatment can be employed. However, mere application of the induction heating treatment to the surface of a shape similar to the shape of the outer member 1, having the vehicle body fitting flange 1a, or the hub 9 having the wheel mounting flange 9a, requires the use of an induction coil of a very complicated shape and is not therefore practical in terms of cost.

Also, where only required portions such as, for example, the root portion 1aa of the vehicle body fitting flange 1a and the root portion 9aa of the wheel mounting flange 9a are to be hardened by means of the induction heating treatment, the induction heating treatment is carried out subsequent to the turning and, therefore, deformation tends to occur as a result of expansion taking place during transformation to the martensite structure. For this reason, fluctuation and/or warping may occur in the vehicle body fitting flange 1a and/or the wheel mounting flange 9a to such an extent that post-modification and/or scale removal by way of post-turning (mechanical processing) may be required, resulting in increase of the cost.

In contrast thereto, as far as only the surface region is thermally treated such as practiced in the embodiment of the present invention, turning is performed after the heat treatment (thermally refinement) and, therefore, fluctuation in the vehicle body fitting flange 1a and/or the wheel mounting flange 9a is similar to that brought about in the conventional processing. Also, the scale can be removed by means of any known shot blasting technique subsequent to the thermal refinement, and therefore, no removal of the scale will not be performed subsequent to the turning, resulting in reduction of the cost.

If it is not only the surface region that is thermally refined and a member in its entirety is thermally refined by means of the through hardening treatment, when, for example, the hub bolts 15 in the form of the stud bolts are to be press fitted into the corresponding press-fit holes 16 defined in the wheel mounting flange 9a integral with the hub 9, it is hard for serrations of the hub bolts 15 to interlock with (bite into) the holes 16 of the wheel mounting flange 9a due to the thermally refined structure of low machinability. For this reason, when the wheel nut to be fastened to each of the hub bolts 15 is turned at a torque exceeding the specific value, there is the possibility that the slip torque, at which the serrations of each hub bolts 15 undergoes slippage impatiently, may be lowered.

In contrast thereto, with the cored hardening being performed in the practice of the embodiment of the present invention as hereinabove described, since the core region is cooled at a cooling velocity of a value comparable with normalizing, it results in the as-forged structure consisting of ferrite and pearlite, and, therefore, the machinability thereof is higher than that of the thermally refined structure and as a result, the serrations of each of the hub bolts 15 can be easily interlocked with the holes 16 of the wheel mounting flange 9*a*. For this reason, the slip torque of a value comparable with that not thermally refined can be secured.

Figure 6:
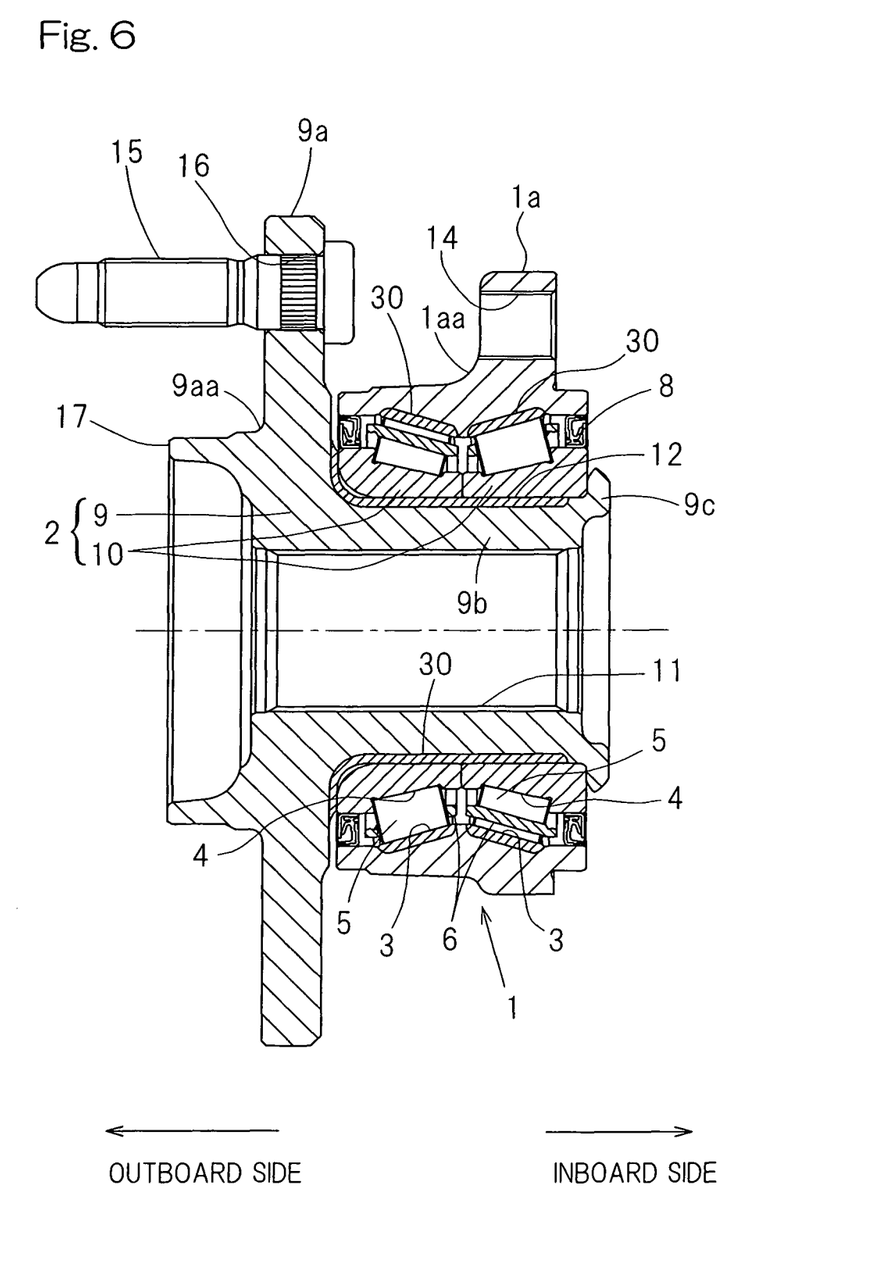
FIG. 6 is a sectional view showing the wheel support bearing assembly according to a second preferred embodiment of the present invention.

FIG. 6 illustrates a second preferred embodiment of the present invention. According to this second embodiment, the wheel support bearing assembly is similar to that shown in and described with reference to FIGS. 1 to 5 in connection with the first embodiment of the present invention, but differs therefrom in that the cap 13 provided in the center bore 11 in the hub 9 is dispensed with and the wheel support bearing assembly in this second embodiment is for use in rotatably supporting a vehicle drive wheel. In other words, when a stem portion (not shown) of a constant velocity universal joint outer ring is inserted into the center bore 11 of the hub 9 and the inner member 2 is then sandwiched between a stepped face of the stem portion in the vicinity of a base end thereof and a nut threadingly engaged with a tip end thereof, the wheel support bearing assembly and the constant velocity universal joint are connected together. Other structural features than those described above are similar to those shown and described in connection with the previously described first embodiment with particular reference to FIGS. 1 to 5.

Figure 7:
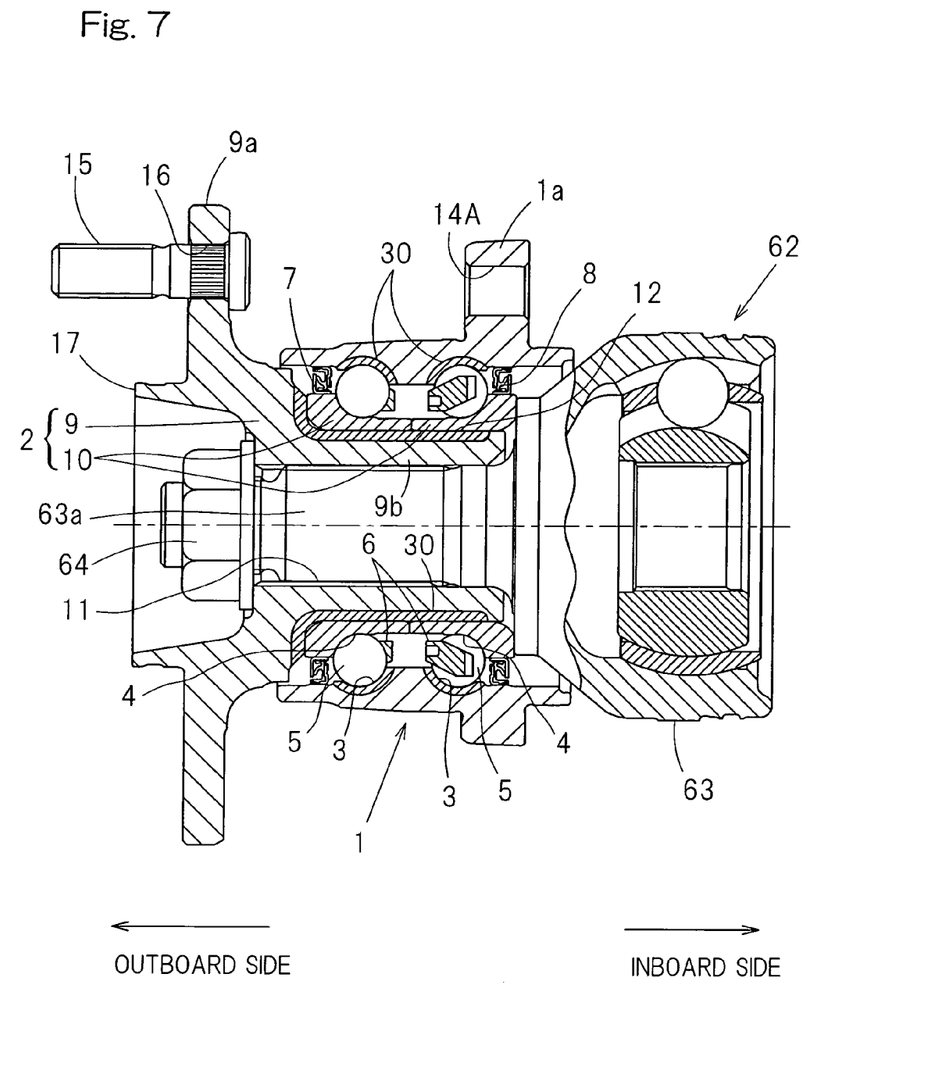
FIG. 7 is a sectional view showing the wheel support bearing assembly according to a third preferred embodiment of the present invention.

FIG. 7 illustrates a third preferred embodiment of the present invention. The wheel support bearing assembly according to this third embodiment is a double row angular contact ball bearing type classified as the second generation and is of an inner ring rotating type and for use in rotatably supporting the vehicle drive wheel. The wheel support bearing assembly shown to therein is such that in the previously described second embodiment shown in FIG. 6, the tapered rollers, which are the rolling elements 5, are replaced with balls. No inboard end of the axle portion 9*b* of the hub 9 is formed with a crimped portion. In such case, the wheel support bearing assembly and a constant velocity universal joint 62 are coupled together by inserting a stem portion 63*a* of a joint outer ring 63 of a constant velocity universal joint 62 into the center bore 11 of the hub 9 and then sandwiching the inner member 2 between a stepped face of the stem portion 63*a* in the vicinity of a base end thereof and a nut 64 threadingly engaged with a tip end thereof. The bolt hole 14 in the vehicle body fitting flange 1*a* integral with the outer member 1, which is shown in FIG. 6, is replaced with a bolt insertion hole 14A. When a knuckle bolt passed through the bolt insertion hole 14A from the outboard side is threadingly engaged with a bolt hole in the knuckle, the vehicle fitting flange 1*a* is bolted to the knuckle. Other structural features than those described above are similar to those employed in the first embodiment shown in and described with particular reference to FIGS. 1 to 5.

Figure 8:
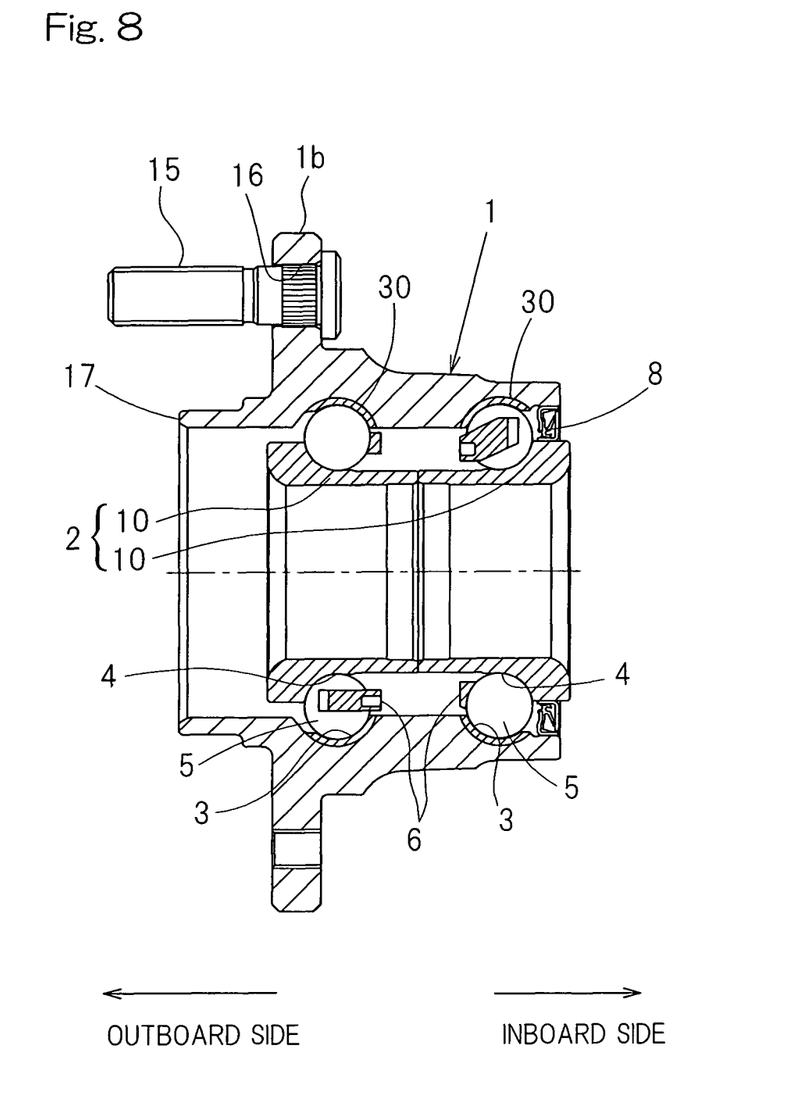
FIG. 8 is a sectional view showing the wheel support bearing assembly according to a fourth preferred embodiment of the present invention.

FIG. 8 illustrates a fourth preferred embodiment of the present invention. The wheel support bearing assembly according to the fourth embodiment is a double row angular contact ball bearing type classified as the second generation type and is of an outer ring rotating type for use in rotatably supporting a vehicle driven wheel. This wheel support bearing assembly includes an outer member 1 having an inner periphery formed with double row rolling surfaces 3 and also having an outer periphery formed with a wheel mounting flange, an inner member 2 having raceway surfaces 4 defined therein so as to align respectively with those raceway surfaces 3, and double row rolling elements 5 interposed between the raceway surfaces 3 and the raceway surfaces 4. A portion of the outer member 1 adjacent a root portion of the wheel mounting flange 1*b* has a cylindrical pilot area 17 defined therein so as to protrude axially outwardly towards the outboard side for guiding a brake rotor and the vehicle wheel, both not shown. The inner member 2 is in the form of a split type inner ring assembly having two inner rings 10 arranged in a coaxial relation with each other in an axial direction thereof and having the respective raceway surfaces 4 defined therein. This inner member 2 has an inner diametric surface to which an axle (not shown) is fixed. The rolling elements 5 are employed in the form of balls and the balls of each row are retained by a retainer 6. An annular bearing space delimited between the outer and inner members 1 and 2 has an inboard end, sealed by a sealing unit 8, and an outboard end sealed by a cap (not shown) that is engaged in a pilot inner diametric portion.

In the case of this fourth embodiment, a surface region of the outer member 1, which is used as a flanged rotatable ring, is an area of a thermally refined structure formed by means of martensite hardening and high temperature tempering, while a core region thereof is rendered to be an as-forged structure made of ferrite and pearlite. Other structural features than those described above are similar to those employed in the first embodiment shown in and described with particular reference to FIGS. 1 to 5.

Figure 9:
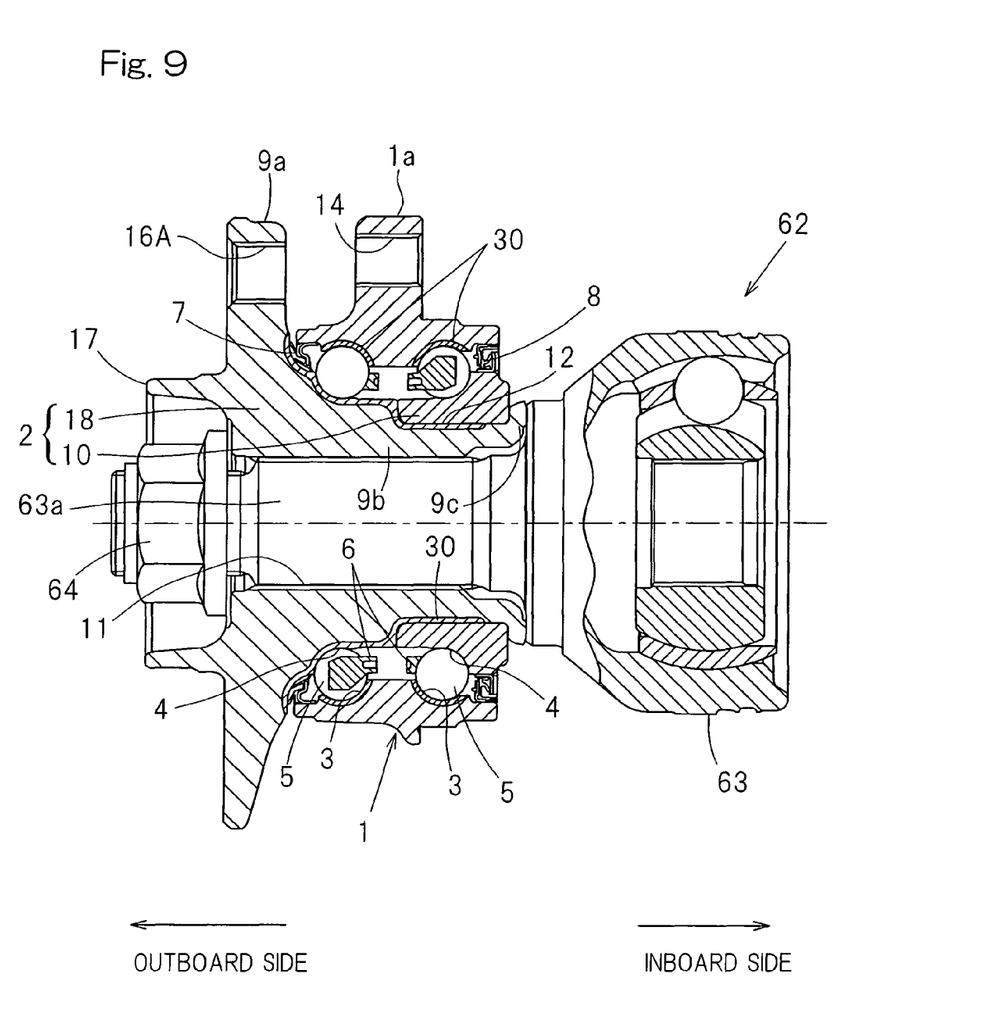
FIG. 9 is a sectional view showing the wheel support bearing assembly according to a fifth preferred embodiment of the present invention.

FIG. 9 illustrates a fifth preferred embodiment of the present invention. The wheel support bearing assembly according to this fifth embodiment is in the form of a double row angular contact ball bearing type classified as the third generation type and is of an inner ring rotating type for rotatably supporting a vehicle drive wheel. This wheel support bearing assembly is similar to that according to the third embodiment, shown in and described with particular reference to FIG. 7, but differs therefrom in that the inner member 2, forming a rotatable member, is made up of a hub ring 18 having a wheel mounting flange 9*a* formed therein, and an inner ring 10 mounted on an outer periphery of an inboard end of an axle portion 9*b* of the hub ring 18. The raceway surfaces 4 referred to previously are formed respectively in the hub ring 18 and the inner ring 10.

The inboard end of the axle portion 9*b* of the hub ring 18 is formed with a crimped portion 9*c* for fixedly crimping the inner ring 10. In this case, when the inner member 2 is sandwiched between a nut 64, threadingly mounted on a tip end of the stem portion 63*a* of the joint outer ring 63 of the constant velocity universal joint 62, and a back face of the joint outer ring 63 of the constant velocity universal joint 62, which face is held in contact with the crimped portion 9*c*, the wheel support bearing assembly and the constant velocity universal joint 62 can be connected together. The vehicle body fitting flange 1*a* of the outer member 1 is provided with a bolt hole 14 for securement of the wheel support bearing assembly to a vehicle body structure. When a knuckle bolt passed through a bolt insertion hole in a knuckle from the inboard side, is threaded into this bolt hole 14, the flange 1*a* can be bolted to the knuckle.

A press-fit hole 16 in the wheel mounting flange 9*a* integral with the hub ring 18 is replaced with a bolt hole 16A and, when a wheel bolt (not shown), which has been passed from the outboard side into a bolt insertion hole, defined in the wheel, by way of a brake rotor overlapped with the wheel mounting flange 9*a*, is threaded into the bolt hole 16A, the brake rotor and the wheel can be bolted to the wheel mounting flange 9*a*. An area where the thermally refined structure is formed in the hub ring 18 is a surface region of such hub ring 18, and an area ranging from the inner ring mounting surface area 12 to a location on the inboard side in the vicinity of the root portion of the wheel mounting flange 9a is rendered to be an induction heat treated, hardened region 30. An area where the thermally refined structure is formed in the outer member 1 is a surface region of such outer member 1, and a part of each of the rows of the raceway surfaces 3 is rendered to be an induction heat treated, hardened region 30. Other structural features than those described above are similar to those employed in the first embodiment shown in and described with particular reference to FIGS. 1 to 5.

Even in this embodiment, the surface region of the wheel mounting flange 9a integral with the hub ring 18, for example, is the portion where the thermally refined structure is formed by means of martensite hardening and high temperature tempering. In this case, although the wheel mounting flange 9a is provided with the bolt hole 16A, the machinability of the bolt hole 16A during the processing improves because the core region remains an as-forged structure.

Figure 10:
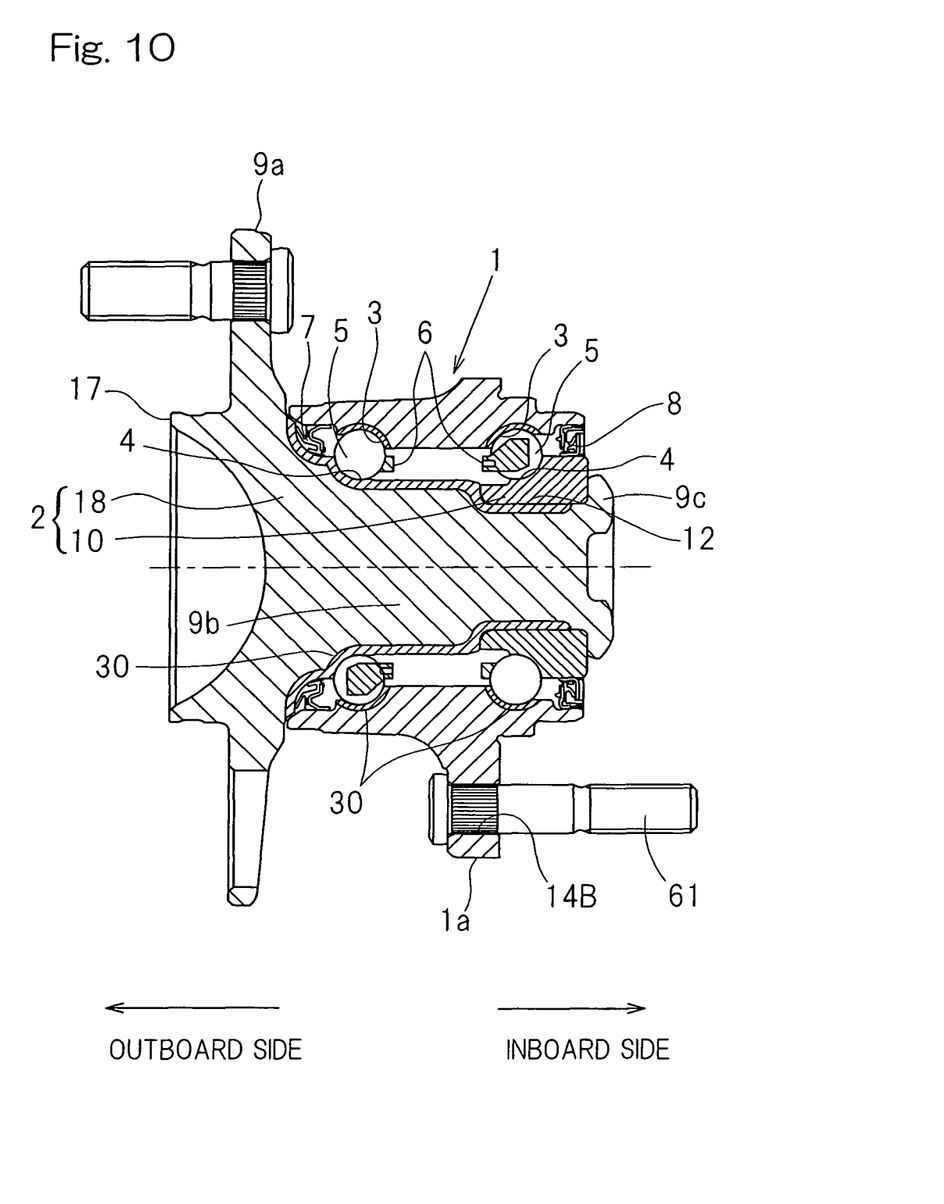
FIG. 10 is a sectional view showing the wheel support bearing assembly according to a sixth preferred embodiment of the present invention.

FIG. 10 illustrates a sixth preferred embodiment of the present invention. The wheel support bearing assembly according to this sixth embodiment is a double row angular contact ball bearing type classified as the third generation type and is of an inner ring rotating type for rotatably supporting the vehicle driven wheel. The inner member 2, which is used as a rotatable member, includes a hub ring 18 having a wheel mounting flange 9a formed therein, and an inner ring 10 mounted on an outer periphery of the inboard end of the axle portion 9b of the hub ring 18, and a crimped portion 9c for fixedly crimping the inner ring 10 is formed in the inboard end of the axle portion 9b of the hub ring 18. The hub ring 18 is of a solid structure and has no center bore 11 defined therein such as shown and employed in the practice of the first embodiment in FIGS. 1 to 5. A press-fit hole 14B is formed in the vehicle body fitting flange 1a integral with the outer member 1 and a knuckle bolt 61 in the form of a stud bolt is press-fitted into this press-fit hole 14B. When the knuckle bolt 61 is passed through a bolt insertion hole defined in the knuckle and a nut is threadingly mounted thereon, the vehicle body fitting flange 1a is bolted to the knuckle. An area where the thermally refined structure is formed in the hub ring 18 is a surface region of such hub ring 18, and an area ranging from the inner ring mounting surface area 12 to a location on the inboard side in the vicinity of the root portion of the wheel mounting flange 9a is rendered to be an induction heat treated, hardened region 30. An area where the thermally refined structure is formed in the outer member 1 is a surface region of such outer member 1, and a part of each of the rows of the raceway surfaces 3 is rendered to be an induction heat treated, hardened region 30. Other structural features than those described above are similar to those employed in the first embodiment shown in and described with particular reference to FIGS. 1 to 5.

Even in this embodiment, the surface region of the vehicle body fitting flange 1a integral with the outer member 1, for example, can be rendered to be the portion where the thermally refined structure is formed by means of martensite hardening and high temperature tempering. In this case, although the knuckle bolt 61 in the form of a stud bolt is press-fitted into the vehicle body fitting flange 1a, the serrations of the knuckle bolt 61 can be favorably interlocked with the holes 14B of the vehicle fitting flange 1a because the martensite hardening is a cored hardening. For this reason, the slip torque comparable with the case where no thermally hardening is effected can be secured, as mentioned above.

Figure 11:
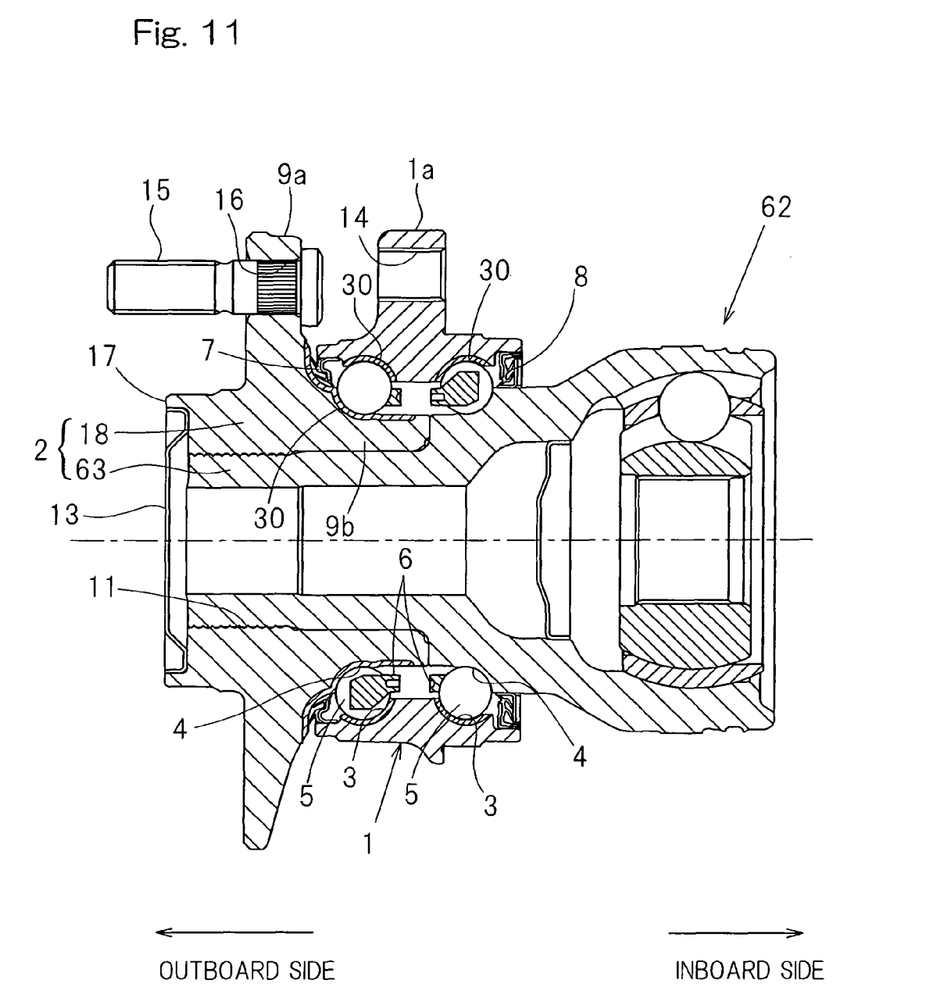
FIG. 11 is a sectional view showing the wheel support bearing assembly according to a seventh preferred embodiment of the present invention.

FIG. 11 illustrates a seventh preferred embodiment of the present invention. The wheel support bearing assembly according to this seventh embodiment is a double row angular contact ball bearing type classified as the fourth generation type and is of an inner ring rotating type for rotatably supporting the vehicle drive wheel. The inner member 2 includes a hub ring 18 and a joint outer ring 63 of the constant velocity universal joint 62 that is inserted into a center bore 11 in the hub ring 18, and of the double row rolling surfaces 4 opposed to the respective rolling surfaces 3 of the outer member 1, each row of the rolling surfaces 4 are formed in the hub ring 18 and the constant velocity universal joint outer ring 63, respectively. The rolling elements 5 are employed in the form of balls. Also, the sealing unit 8 on the inboard side is interposed between an inner diametric surface of the outer member 1 and an outer diametric surface of the constant velocity universal joint outer ring 63. A bolt hole 14 is provided in the vehicle body fitting flange 1a at a plurality of circumferential locations thereof, and when the knuckle bolt, which has been passed into a bolt insertion hole in the knuckle from the inboard side, is threadingly engaged within the bolt hole 14 in the vehicle body fitting flange 1a, the vehicle fitting flange 1a can be bolted to the knuckle. An area where the thermally refined structure is formed in the hub ring 18 is a surface region of such hub ring 18, and an area ranging from a surface area on the inboard side, including the rolling surfaces 4 in the axle portion 9b, to a location on the inboard side in the vicinity of the root portion of the wheel mounting flange 9a is rendered to be an induction heat treated, hardened region 30. An area where the thermally refined structure is formed in the outer member 1 is a surface region of such outer member 1, and a part of each of the rows of the raceway surfaces 3 is rendered to be an induction heat treated, hardened region 30. Other structural features than those described above are similar to those employed in the first embodiment shown in and described with particular reference to FIGS. 1 to 5.

Figure 12:
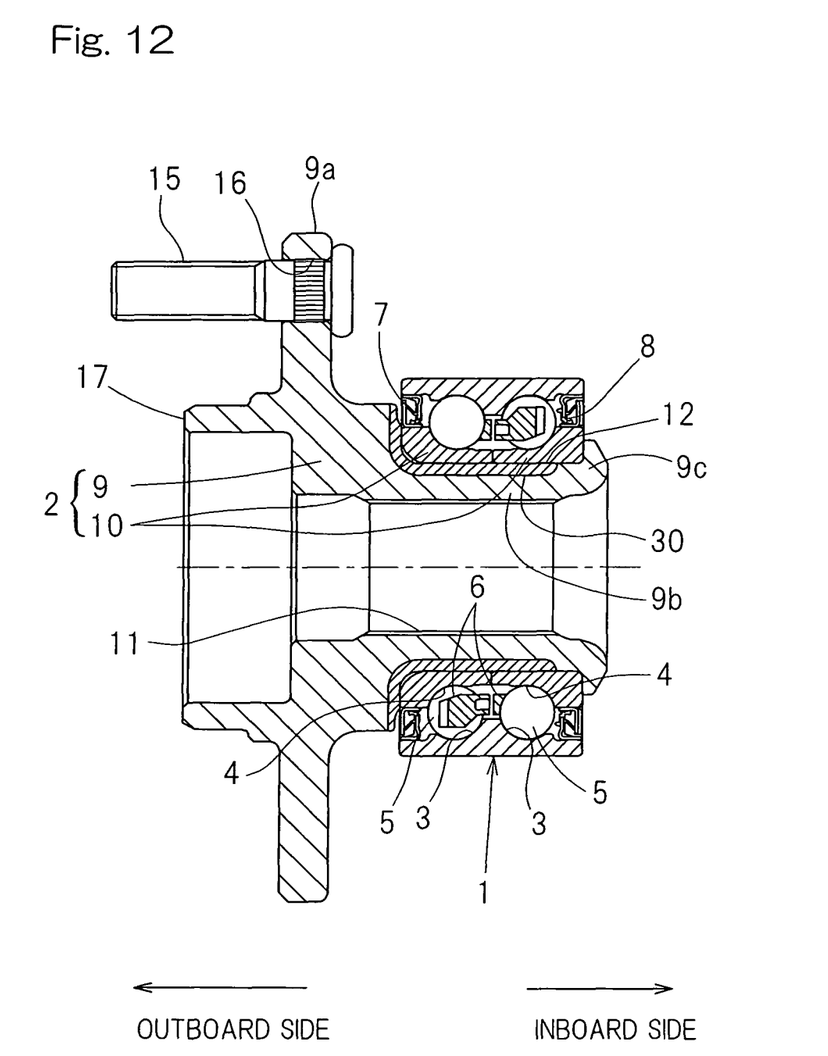
FIG. 12 is a sectional view showing the wheel support bearing assembly according to an eighth preferred embodiment of the present invention.

FIG. 12 illustrates an eighth preferred embodiment of the present invention. The wheel support bearing assembly according to this eighth embodiment is a double row angular contact ball bearing type classified as the first generation type and is of an inner ring rotating type for use in rotatably supporting a vehicle drive wheel. This wheel support bearing assembly is similar to that according to the third embodiment described with particular reference to FIG. 7, but differs therefrom in that the outer diametric surface of the outer member 1 in its entirety is rendered to be a cylindrical surface and no vehicle body fitting flange 1a is formed therein. The outer member 1 is fixed to the knuckle when engaged in an inner diametric surface of the cylindrical knuckle. The inner ring 10 is axially fixed to the hub 9 by means of a crimped portion 9c provided at an inboard end of the axle portion 9b of the hub 9. Other structural features than those described above are similar to those shown and described in connection with the third embodiment with particular reference to FIG. 7.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Outer member
1a: Vehicle body fitting flange 1b, 9a: Wheel mounting flange
2: Inner member
3, 4: Rolling surface
5: Rolling element
9: Hub (Flanged rotatable ring)
9c: Crimped portion
10: Inner ring
18: Hub ring
30: Induction heat treated, hardened region

What is claimed is:

1. A wheel support bearing assembly for rotatably supporting a vehicle wheel relative to a vehicle body structure, which assembly comprises:
   an outer member having an inner periphery formed with double row rolling surfaces and also having an outer periphery formed with a vehicle fitting flange through which the wheel support bearing assembly is fitted to the vehicle body structure;
   an inner member having an outer periphery formed with raceway surfaces held in face-to-face relation with the respective raceway surfaces in the outer member; and
   double row rolling elements interposed between those raceway surfaces,
   in which the outer member is made of a steel material and has a surface region having a thermally refined structure, formed by means of martensite hardening and tempering, and also has a core region having an as-forged structure made of ferrite and pearlite.

2. The wheel support bearing assembly as claimed in claim 1, in which the inner member includes a sole flanged rotatable ring member having an outer periphery thereof formed with a raceway surface and a wheel mounting flange for the support of a vehicle wheel, or a combination of the flanged rotatable ring, a wheel mounting flange defined therein, and a separate member mounted on the flanged rotatable ring and having the raceway surface; and
   in which the flanged rotatable ring is made of a steel material and has a surface region representing a thermally refined structure formed by means of martensite hardening and high temperature tempering and also has a core region representing an as-forged structure comprised of ferrite and pearlite.

3. The wheel support bearing assembly as claimed in claim 2, in which the separate member is fixed to the flanged rotatable ring by means of crimping of the flanged rotatable ring.

4. The wheel support bearing assembly as claimed in claim 1, in which the outer member has an outer diametric portion having a forged skin portion and the forged skin portion has a surface representing a thermally refined structure.

5. The wheel support bearing assembly as claimed in claim 1, in which the vehicle body fitting flange has a root portion having a surface thereof, the surface of the root portion representing a turned surface of an arcuate sectioned configuration and also representing a thermally refined structure.

6. The wheel support bearing assembly as claimed in claim 1, in which the inner member includes a combination of a flanged rotatable ring and a separate member mounted on the flanged rotatable ring and also having the raceway surfaces, in which the flanged rotatable member and the separate member are formed with the respective rows of the raceway surfaces and the separate member is fixed to the flanged rotatable ring by means of crimping of the flanged rotatable ring.

7. A wheel support bearing assembly for rotatably supporting a vehicle wheel relative to a vehicle body structure, which assembly comprises:
   an outer member having an inner periphery formed with double row rolling surfaces;
   an inner member having an outer periphery formed with raceway surfaces held in face-to-face relation with the respective raceway surfaces in the outer member; and
   double row rolling elements interposed between those raceway surfaces,
   in which one of the outer and inner members, which is used as a rotatable member, includes
      a sole flanged rotatable ring member having an outer periphery thereof formed with a raceway surface, and
      a wheel mounting flange for the support of a vehicle wheel; and
   in which the flanged rotatable ring is made of a steel material and has a surface region representing a thermally refined structure formed by means of martensite hardening and tempering and also has a core region representing an as-forged structure comprised of ferrite and pearlite.

8. The wheel support bearing assembly as claimed in claim 7, in which the outer member has an outer diametric portion having a forged skin portion and the forged skin portion has a surface representing a thermally refined structure.

9. The wheel support bearing assembly as claimed in claim 7, in which the vehicle body fitting flange has a root portion having a surface thereof, the surface of the root portion representing a turned surface of an arcuate sectioned configuration and also representing a thermally refined structure.

10. A wheel support bearing assembly for rotatably supporting a vehicle wheel relative to a vehicle body structure, which assembly comprises:
   an outer member having an inner periphery formed with double row rolling surfaces;
   an inner member having an outer periphery formed with raceway surfaces held in face-to-face relation with the respective raceway surfaces in the outer member; and
   double row rolling elements interposed between those raceway surfaces,
   in which one of the outer and inner members, which is used as a rotatable member, includes a combination of a flanged rotatable ring, a wheel mounting flange, and a separate member mounted on the flanged rotatable ring and having the raceway surface, and
   in which the flanged rotatable ring is made of a steel material and has a surface region representing a thermally refined structure formed by means of martensite hardening and tempering and also has a core region representing an as-forged structure comprised of ferrite and pearlite.

* * * * *

UNITED STATES PATENT AND TRADEMARK OFFICE
CERTIFICATE OF CORRECTION

| | | |
|---|---|---|
| PATENT NO. | : 8,714,829 B2 | Page 1 of 1 |
| APPLICATION NO. | : 12/737798 | |
| DATED | : May 6, 2014 | |
| INVENTOR(S) | : Hirai | |

It is certified that error appears in the above-identified patent and that said Letters Patent is hereby corrected as shown below:

In the Claims

Column 13, Line 40, in Claim 2, delete "high temperature".

Signed and Sealed this
Twenty-third Day of September, 2014

Michelle K. Lee
*Deputy Director of the United States Patent and Trademark Office*